United States Patent [19]

Ritter, Jr.

[11] Patent Number: 4,690,221
[45] Date of Patent: Sep. 1, 1987

[54] WELL TUBING HANGER METHOD AND APPARATUS FOR USE IN WELL CONTROL

[75] Inventor: Paul B. Ritter, Jr., Bakersfield, Calif.

[73] Assignee: Shell California Production Inc., Houston, Tex.

[21] Appl. No.: 881,762

[22] Filed: Jul. 3, 1986

[51] Int. Cl.⁴ .................. E21B 23/00; E21B 33/04; F16L 21/04

[52] U.S. Cl. .................. 166/382; 166/85; 166/86; 166/88; 285/142

[58] Field of Search .......... 166/82, 84, 86, 88, 166/75.1, 85, 381, 382, 387; 285/140, 142, 143

[56] References Cited

U.S. PATENT DOCUMENTS

| | | | |
|---|---|---|---|
| 1,389,920 | 9/1921 | Weaver et al. | 166/86 |
| 2,148,327 | 2/1939 | Smith et al. | 166/86 X |
| 2,150,887 | 3/1939 | Mueller et al. | 166/86 X |
| 2,241,333 | 5/1941 | Smith | 166/86 X |
| 2,277,380 | 3/1942 | Yancey | 166/86 X |
| 3,001,803 | 9/1961 | Watts et al. | 166/75.1 X |
| 4,190,270 | 2/1980 | Vanderford | 285/142 |
| 4,327,804 | 5/1982 | Reed | 166/86 X |

*Primary Examiner*—Stephen J. Novosad

[57] ABSTRACT

A well tubing hanger designed for severe service applications includes an annular seal formed about the tubing hanger exterior that is not energized during normal well operations. The annular seal is energized by lowering the tubing hanger downward within the tubing head until the annular seal subsequently contacts in a fluid-tight manner both the tubing hanger and the tubing head. The tubing hanger is lowered relative to the tubing head by rotative disengagement of a treaded mandrel operatively connected between the tubing hanger and the tubing head. The annular seal is energized prior to installation or removal of well flow control equipment located above the tubing hanger and tubing head, preferably after well fluid flow through the well has been secured.

23 Claims, 3 Drawing Figures

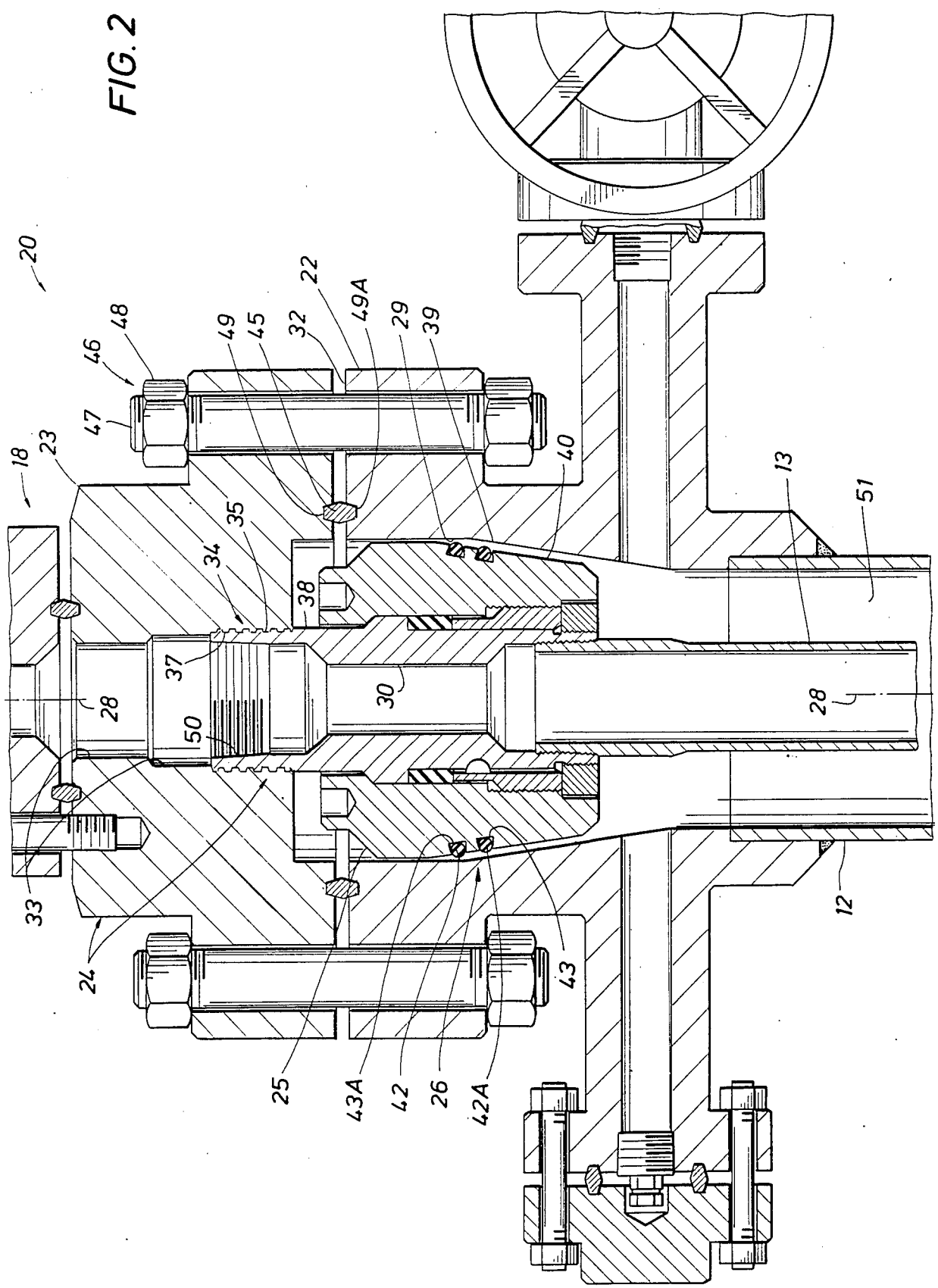

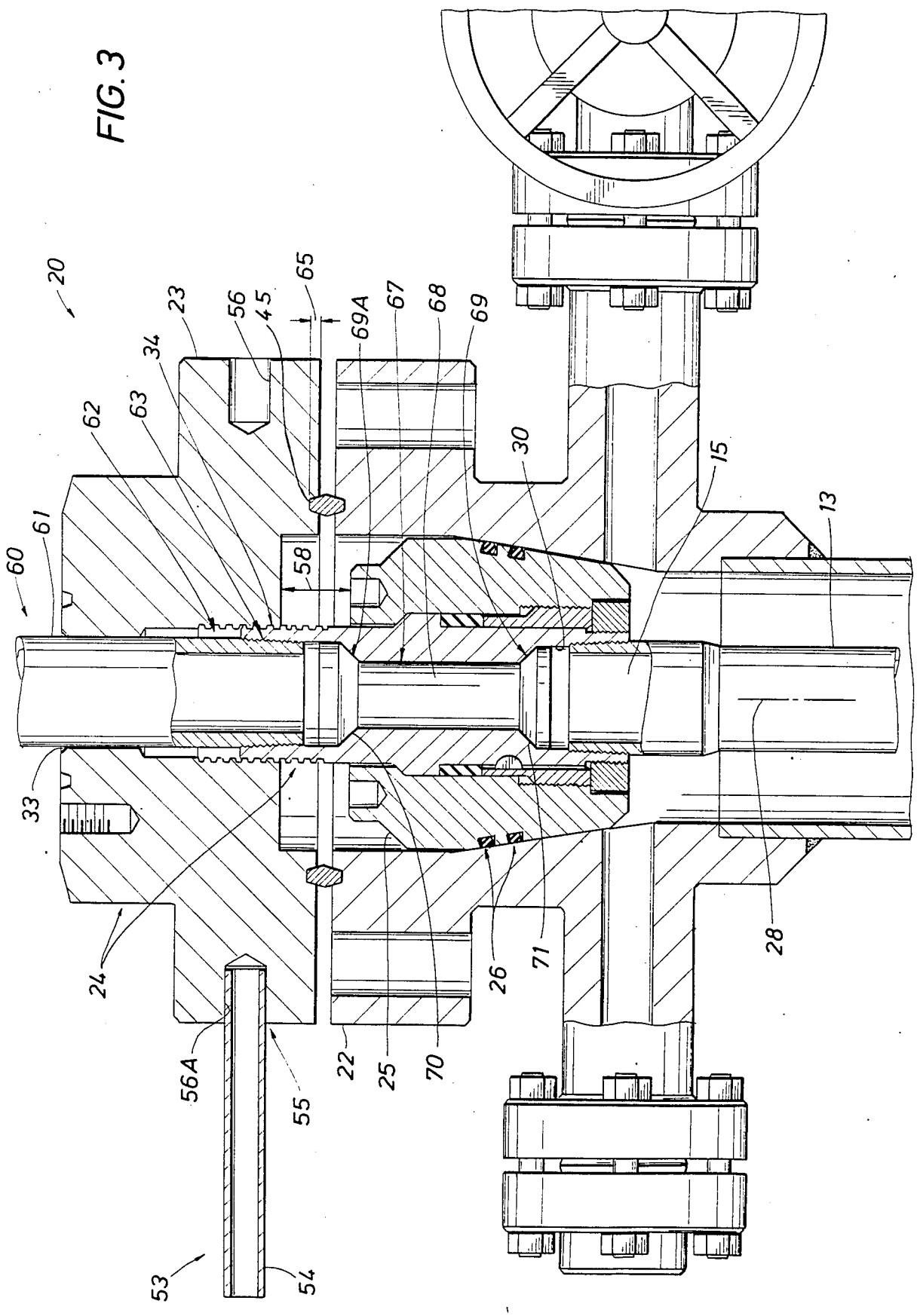

WELL TUBING HANGER METHOD AND APPARATUS FOR USE IN WELL CONTROL

BACKGROUND OF THE INVENTION

1. Field of the Invention

The present invention relates to an improved well tubular hanger having a seal system suitable for operation when subjected to wide variations in temperature. Such temperature variations may be experienced, for example, during production in Alaska ($-75°$ F. to $250°$ F.) and in steam injection applications (up to $1000°$ F.).

2. Description of the Prior Art

As discussed in U.S. Pat. No. 4,190,270 issued Feb. 26, 1980 to Vanderford, entitled "Tubing Hanger for Temperature Variations and Extremes", a tubing system is disclosed wherein the pressure seal is maintained by a metal seal ring. As shown in FIG. 3 of this patent, a sleeve is used to force the metal seal ring downwardly within an annular space defined between the head and body of the apparatus. The location of the seal ring provides an additional pressure boundary between pressurized annulus fluids and wellhead components located above the seal ring. Operation of the seal ring, however, requires actuation of a pin 128 to force sleeve 124 downward. The opening required for pin 128 through the head 100 creates a potential leak spot through the head.

A seal apparatus therefore needs to be developed that minimizes the amount of potential leak sources from the head of a well. Such a system should provide a positive pressure seal when it is desired to isolate a potentially pressurized annulus from wellhead components located above the tubing hanger.

SUMMARY OF THE INVENTION

The present invention comprises a moveable tubing hanger located within a tubing head, the tubing hanger having a seal defined in an annular manner about its exterior. The seal is not energized in a fluid-tight manner during the normal producing or injection condition of the well. The seal is only used to provide a pressure boundary between the tubing hanger and the tubing head when it is desired to install or remove well components located above the tubing head of the well. Since the seal is not "energized" during normal well operations (not subject to compressive set or other problems associated with seal compression during thermal cycling), the seal retains its fluid sealing properties even after being subjected to high temperatures such as would be encountered in a steam injection well. The seal is only actuated after the injection or production operation has been terminated.

To actuate the seal the tubing hanger is moved downward within the tubing head.

In a preferred embodiment, a seal flange located above the tubing head and the moveable tubing hanger has a threaded coupling formed common to both flange and hanger such that by rotation of the seal flange the tubing hanger is lowered downward within the tubing head. Such downward movement causes the seal to engage between the tubing hanger and the tubing head. The weight of the tubing suspended from the tubing head assists in insuring that the seal engages in a fluid-tight manner between the hanger and the tubing head.

An object of the present invention, therefore, is to provide an improved hanger sealing system which can form pressure-tight seal after being subjected to temperature cycling and extremes of temperature.

Another object is to provide an improved tubing hanger having a seal which withstands extreme temperature variations yet still maintains a seal between the hanger and the tubing head during the installation and/or removal of well equipment located above the tubing head.

It is a feature of the present invention to provide a moveable tubing hanger capble of axial movement relative to the tubing head. It is another feature of the present invention to provide axial movement means operatively connected between the moveable tubing hanger and the tubing head to axially move the tubing hanger relative to the tubing head, so as to engage a seal in a fluid-tight manner between the tubing head and the moveable tubing hanger, and to disengage the seal from the fluid-tight engagement between the tubing head and the moveable tubing hanger.

BRIEF DESCRIPTION OF THE DRAWINGS

These and other objects and advantages of the present invention are hereinafter set forth and explained with reference to the drawings wherein:

FIG. 2 shows a schematic representation and partial cross-section of the well tubing hanger apparatus shown in more detail, the seal means not forming a pressure tight boundary between the tubing hanger and the tubing head.

FIG. 3 shows a schematic representation in partial cross-section of the well tubing hanger apparatus, showing the seal means engaged in a fluid-tight manner between the movable tubing hanger and the tubing head.

DESCRIPTION OF THE PREFERRED EMBODIMENT

Figure 1:
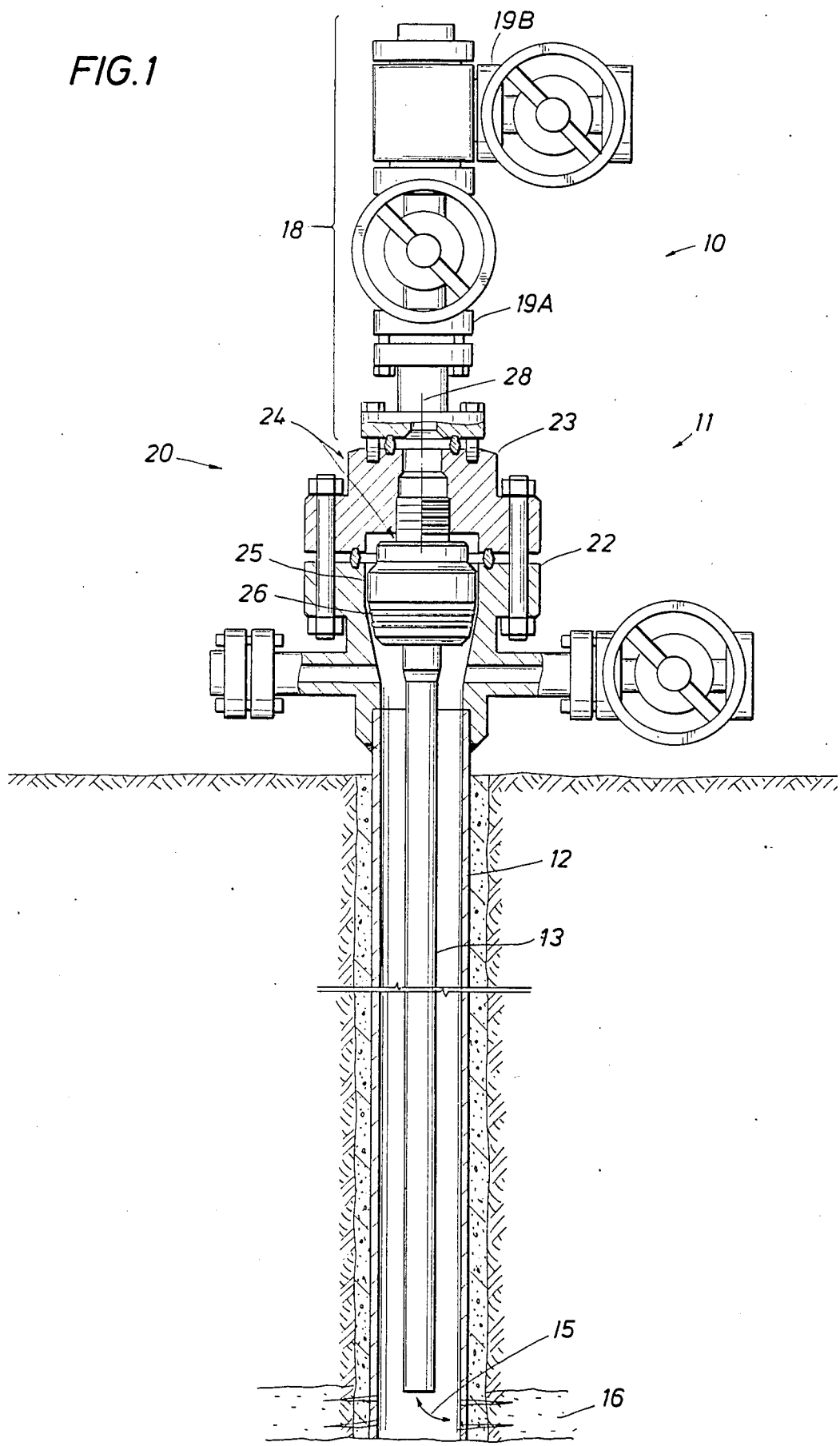
FIG. 1 shows a schematic representation in partial cross-section of a well tubing hanger apparatus of the preferred embodiment of the present invention.

Referring now to FIG. 1 the well 10 having a wellhead 11 casing 12 and tubing string 13 is shown controlling the flow of well fluids 15 to or from a typical formation 16, as is well known to the art. The well 10 may be a production well, or a steam injection well, or any other well known to the art. Well 10 may also include for example wellhead valve apparatus 18 which may for example incorporate the use of valves 19A, 19B. It should be well recognized that wellhead valve apparatus 18 may take many forms, dependent upon the desired well operation to be conducted, such as a typical production tree well known to the art, or for example blowout prevention equipment that may be used during the workover or completion of a well.

The well tubing hanger apparatus 20 of the present invention can be seen to include a tubing head 22, a seal flange 23 which forms a portion of axial movement means 24, a moveable tubing hanger 25 having the other portion of the axial movement means 24, and seal means 26 which in a preferred embodiment comprises elastomeric seals well known to the art. As can be seen from FIG. 1, the elements of the well tubing hanger apparatus 20 in a preferred embodiment are arranged in a concentric manner around a common central longitudinal axis 28 defined through the center of each element 22, 23, 24, 25, and 26. It should be well recognized, of course, that in the case of a dual completion well a plurality of apparatus 20 may be used.

Referring now to FIG. 2 the well tubing hanger apparatus 20 may be described in more detail. The tubing head 22 can be seen to have a tubing head central opening 29 defined upwardly therethrough. The moveable tubing hanger 25 is centrally positioned within the tubing head central opening 29 and in a preferred embodiment has a tubing hanger central opening 30 defined upwardly therethrough, the moveable tubing hanger 25 being axially moveable relative to the tubing head 22 along the central longitudinal axis 28. The well tubing hanger apparatus 20 also includes seal means 26 as mentioned earlier located in a preferred embodiment between tubing head 22 and the tubing hanger 25, the seal means 26 being engageable in a fluid-tight manner between the tubing head 22 and the tubing hanger 25.

In a preferred embodiment the axial movement means 24 are operatively connected between the moveable tubing hanger 25 and the tubing head 22 to axially move the tubing hanger 25 relative to the tubing head 22 along the central longitudinal axis 28, so as to engage the seal means 26 in a fluid-tight manner between the tubing head 22 and the moveable tubing hanger 25, and thereafter to disengage the seal means 26 from the fluid-tight engagement between the tubing head 22 and the moveable tubing hanger 25, dependent of course upon the direction of axial movement of the hanger 25 relative to the tubing head 22.

It shall be well recognized that the seal means 26 may be located in other positions relative to the hanger 25 and tubing head 22 depending upon the design and configuration of the cooperating surfaces formed between the head 22 and the hanger 25.

The axial movement means 24 in a preferred embodiment further include the seal flange 23 operatively carried in a fluid-tight manner by the upper surface 32 of the tubing head 22 and located above the moveable tubing hanger 25, the seal flange 23 having a central longitudinal axis common with the central longitudinal axis 28 of the tubing head 22 and having a seal flange central opening 33 defined upwardly therethrough. The axial movement means 24 can also be seen to include threaded engagement means 34 operatively connected between the seal flange 23 and the moveable tubing hanger 25. The threaded engagement means in a preferred embodiment have a first portion and a second portion both portions having cooperating threads 35 being rotatably engaged with one another. In a preferred embodiment, rotation of the seal flange 23 about central longitudinal axis 28 and thereby rotation of the threaded engagement means 34 between the seal flange 23 and the tubing hanger 25 causes the moveable tubing hanger 25 to move axially relative to the tubing head 22. One of the threaded engagement means portions is operatively formed adjacent at least a portion of the seal flange central opening 33 and another of the threaded engagement means 34 portions is operatively formed adjacent a portion of the tubing hanger central opening 30.

In a preferred embodiment the first portion of the threaded engagement means 34 comprises a threaded receptacle 37 formed radially within a portion of the seal flange central opening 33, and the second portion of the threaded engagement means 34 comprises a threaded mandrel 38 operatively connected to the moveable tubing hanger 25 and extending upwardly from the tubing hanger 25 into threaded engagement with the cooperating threads 35 formed by the threaded receptacle 37.

It should be well recognized, of course, that any threaded system may be employed between the seal flange 23 and moveable tubing hanger 25 to move the hanger 25 relative to the seal flange 23.

Any other device may also be used to accomplish the same mechanical result. The tubing hanger 25 may initially for example be set upon a wedge device that may be retracted from beneath the tubing hanger 25 by actuation of pins extendable through the tubing head, when it is desired to lower the tubing hanger 25 downwardly within the tubing head 22. Hydraulic actuators may also be connected to the tubing hanger to accomplish the same mechanical result.

In a preferred embodiment the tubing head 22 can be seen to have an upwardly facing tapered surface 39 defined circumferentially about the interior of the tubing head 22. The moveable tubing hanger 25 in a preferred embodiment can also be seen to include the downwardly facing tapered surface 40 defined circumferentially about the exterior of the moveable tubing hanger 25. Both surfaces 39, 40 are capable of cooperative engagement with one another so as to support the weight of the moveable tubing hanger 25 when the tubing hanger 25 is lowered downward into contact with the tubing head 22.

In a preferred embodiment the seal means 26 can be seen to further include at least one seal ring, such as seal rings 42, 42A shown in FIG. 2, each ring 42, 42A carried in a cooperating annular recess 43, 43A, respectively formed about the exterior of the moveable tubing head 25, each seal ring 42, 42A engageable in a fluid-tight manner with the interior of the tubing head 22 and the exterior of the moveable tubing hanger 25 when the moveable tubing hanger 25 is moved downward within the tubing head 22. Each seal ring 42, 42A, in a preferred embodiment, may form a fluid-tight seal between the tubing hanger 25 and the tubing head 22 prior to the downwardly facing tapered surfce 40 of the tubing hanger 25 coming into contact in a weight supporting manner with the upwardly facing tapered surface of the tubing head 22.

It should also be recognized in an alternative embodiment that the seal means 26 may be carried by the tubing head 22 whereupon annular recesses are formed within the interior surface of the tubing head 22.

Each seal ring 42, 42A is typically formed from an elastomeric material, such as butyl rubber, well known to the art, the material being selected to properly survive in differing operating environments encountered by the well tubing hanger apparatus 20.

It should be recognized of course that in an alternative embodiment, the seal means 26 may comprise metal gaskets well known to the art used instead of gaskets formed from elastomeric material.

The seal flange 23 in a preferred embodiment is operatively carried in a fluid-tight manner by the tubing head upper surface 32 by use of at least one seal flange seal ring 45 positioned between the tubing head 22 and the seal flange 23. The seal flange 23 may be securely fastened to the tubing head 22 by use of fastener means 46 such as an array of bolts 47 and nuts 48, in a manner well known to the art. The seal flange seal ring 45 may be retained in cooperating annular recesses 49, 49A formed in the seal flange 23 and the tubing head 22, respectively.

It should be well recognized that the seal flange 23 in an alternative embodiment may be securely fastened in a fluid-tight manner to the tubing head 22 by means of a threaded connection existing between the seal flange 23 and the tubing head 22.

In a preferred embodiment of the present invention, a standard "F" tubing head housing manufactured by Cameron Iron Works, P. O. Box 4716, Ventura, Calif. 93304, is used for the tubing head 22. The tubing head 22 is welded to the casing 12. The tubing hanger 25 is directly connected to the seal flange 23 by a 5-inch API casing thread and may comprise a "double box bushing" type hanger assembly. A back pressure valve preparation is supplied in the tubing hanger 25. An internal 3½" EUE thread 50 may be cut in the upper portion of the tubing hanger central openings 30 to allow makeup of a handling joint 61 (FIG. 3) used during installation and removal of the tubing hanger 25.

The seal flange 23 threaded receptacle 37 has 5" API casing threads 35 formed thereon. These 5" casing threads 35 in a preferred embodiment are designed so that at full makeup the tubing hanger 25 would not be in contact with the tubing head 22 upwardly facing tapered surface 39, when the seal flange 23 is landed on the seal flange seal ring 45 carried by the tubing head 22. Therefore the tubing hanger 25 is ineffective during production or steaming operations of the well 10 to provide a pressure seal across the annular passage 51 above and below the tubing hanger 25.

In a preferred embodiment after the moveable tubing hanger 25 is lowered downwardly into contact with the tubing head 22, the length of the threads 35 is selected such that during rotation of the seal flange 23 about the threaded mandrel 38 at least two rotations of the seal flange 23 can be made before the seal flange 23 contacts the seal flange seal ring 45 located in annular recess 49A, the seal ring 45 typically consisting of a type "RX" seal ring.

In a preferred embodiment 4"×1¼" bar openings 56 (FIG. 3) may be defined in the side of the seal flange 23 so that four foot torque bars can be inserted in these openings 56 and by manpower or workover rig tugger the seal flange 23 can be rotatably engaged to the threaded mandrel 38 in accordance with API torque specifications.

In a preferred embodiment the seal flange 23 may be formed for example form a standard API 11" flange machined on the bottom with annular recess 49 and drilled and tapped to mate with a 4" API flange on the top surface, in order to connect with either a typical steam injection tree or a rod pump production assembly.

After study of the well tubing hanger apparatus 20 major advantages of the system over the prior art become obvious. The well is controlled during blowout prevention equipment installation and removal by the seal system of the present invention, metal to metal or threaded seals are used throughout the tubing system, the wellhead is capable of operating at high temperature and/or pressure conditions without resilient seal problems or concerns, and lastly, the simple design eliminates tubing hanger seal problems during well operation.

Referring now to FIG. 3, the apparatus of the present invention can be seen to provide a method of well fluid control. In simplest terms the axial movement means 24 may be actuated, thereby causing the moveable tubing hanger 25 to move relative to the tubing head 22. Such movement, depending upon the design and location or the seal means 26, will subsequently cause the engagement of the seal means 26 between the tubing head 22 and the moveable tubing hanger 25 in a fluid-tight manner thereby preventing fluid flow between the tubing head 22 and the tubing hanger 25.

As mentioned earlier, since the axial movement means 24 comprises in a preferred embodiment the seal flange 23 and the threaded engagement means 34 the step of actuation of the axial movement means comprises the step of rotating the seal flange 23 since movement of the seal flange 23 causes corresponding rotative interaction between both portions of the threaded engagement means 24. Movement of seal flange 23 combined with the rotative interaction of the threaded engagement means 34 causes axial movement of the tubing hanger 25 relative to the seal flange 23.

More specifically, the method of the present invention may comprise the following steps.

Torque generation means 53, such as a manually actuatable bar 54 are provided. A portion of the torque generation means 53 may be formed to be operatively connected to the seal flange 23 by use of torque generation connection means 55, in a preferred embodiment consisting of bar openings 56, 56A defined radialy inward about the exterior of the sealing flange 23, the bar openings 56, 56A formed to operatively engage with another portion of the torque generation connection means 55 defined by the exterior of one end of the bar 54 formed to be insertable within at least one of said bar openings 56, 56A. The torque generation means 53 in a preferred embodiment are capable of generation and application of sufficient torque to the threaded engagement means 34 to rotate the seal flange 23 relative to the moveable tubing hanger 25 so as to move the seal flange 23 toward and away from the tubing hanger 25.

It should be well recognized that other devices other than the bar 54 coupled within the bar opening 56 may be used to form the torque generation means 53, in order to accomplish the same mechanical results. Seal flange 23 may be rotated for example by hydraulic and/or pneumatic devices well known to the art.

Prior to rotation of the seal flange 23 the fastener means 46 (shown in FIG. 2) that secure the seal flange 23 to the tubing head 22 are unfastened. Well annulus pressure should be reduced to zero prior to unfastening the fastener means 46.

Torque generation means 53 are then actuated, and thereby seal flange 23 is rotated so as to move the moveable tubing hanger 25 a preferred distance 58 away from seal flange 23. By proper consideration of whether threaded engagement means 34 comprise "right" or "left" handed threads and the direction of rotation of seal flange 23 about central longitudinal axis 28 the moveable tubing hanger 25 and the seal means 26 may therefore be lowered downwardly within the tubing head 22.

Due to the location and inclination of upwardly and downwardly facing tapered surfaced 39, 40 (FIG. 2), such downward movement within the tubing head 22 causes the seal means 26 to engage between the tubing head 22 than the moveable tubing hanger 25, as discussed earlier.

It should be well recognized, of course, that in an alternative embodiment the seal means 26 may be carried by the tubing head 22, or may be carried in any other position whereupon movement of the tubing hanger 25 relative to the tubing head 22 causes a seal to be formed by the seal means 26. Seal means 26 may for example be located on the bottom surface of tubing hanger 25 in order to contact and form a seal upon contact with a lower horizontal shoulder formed by a portion of the tubing head 22 (not shown).

To eliminate unnecessary galling and damage to the material between the seal flange 23 and tubing head 22, such as seal ring 45, in a preferred embodiment tubing hanger lift means 60 comprising a handling joint 61 and other derrick lift equipment well known to the art attached above the handling joint 61 (not shown for clarity), are provided, in order to lift the seal flange 23 off the seal flange seal ring 45 prior to rotation of the seal flange 23. A lower portion 62 of the tubing hanger lift means 60 is formed to be lowered downwardly through the seal flange central opening 33 and be operatively connected by use of hanger lift connection means 63, such as EUE threads 50 (FIG. 2), to the moveable tubing hanger 25. The tubing hanger lift means 60 are capable of lifting at least the moveable tubing hanger 25, the threaded engagement means 34 the seal flange 23 and the seal means 26 a selected distance 65 upward relative to the tubing head 22, so as to avoid contact of the seal flange 23 with the seal ring 45. The tubing hanger lift means 60 may be actuated subsequent to unfastening the fastener means 46 which secure the seal flange 23 to the tubing head 22.

Seal flange 23 may then be rotated so as to move the seal flange 23 at least a preferred distance 58 away from the moveable tubing hanger 25. Since the seal flange 23 in its lifted position no longer operatively contacts tubing head 22 the amount of torque applied by the torque generation means 53 may be significantly reduced from the amount of torque necessary to rotate the seal flange 23 if the flange 23 is rotated while still in contact with the tubing head 22.

Once the seal flange 23 is located the preferred distance 58 away from the moveable tubing hanger 25 the tubing hanger lift means 60 may be actuated so as to lower the hanger 25 downward within the tubing head 22. In this manner the seal means 26 may be engaged between the tubing head 22 and the moveable tubing hanger 25.

The threads 50 of the hanger lift connection means 63 are located on the interior of the moveable tubing hanger 25 adjacent the moveable tubing hanger central opening 30. This threaded portion of the hanger lift connection means 63 is formed to operatively engage in a threaded manner another threaded portion of hanger lift connection means 63 formed about the exterior of the lower end of the tubing hanger lift means 60, the tubing hanger lift means 60 being connectable by engagement of both portions of the hanger lift connection means 63 to the moveable tubing hanger 25.

At some point prior to the formation of the seal between the tubing hanger 25 and the tubing head 22 it is desireable in a preferred embodiment to control the flow of well fluid 15 through the tubing string 13. In a preferred embodiment of the present invention, therefore, flow control means 67 are provided which are capable of controlling the flow of well fluids through the tubing hanger central opening 30. The flow control means 67 such as a Type H 2½" nominal back pressure valve 68 manufactured for example by Cameron Iron Works, Inc., P. O. Box 4716, Ventura, Calif. 93304, may be formed to be lowered downwardly through the seal flange central opening 33 and thereafter operatively connected by use of flow control connection means 69, 69A to the moveable tubing hanger 25. The flow control connection means 69, 69A may be formed by upwardly and downwardly sloping shoulders 70, 71 located on the interior of the moveable tubing hanger 25 adjacent the moveable tubing hanger central opening 30, a portion of the flow control connection means 69, 69A formed to operatively engage with another portion of the flow control connection means 69, 69A formed about the exterior of the flow control means 67.

The flow control means 67 are connectable to the moveable tubing hanger 25 by engagement of both portions of the flow control connection means 69, 69A.

Prior to the step of lowering the flow control means 67 downwardly through the seal flange central opening 33 additional well fluids 15 may be injected within the well to decrease the pressure of the well fluid 15 at the tubing hanger central opening 30 to ambient pressure. In this manner, the operations required to engage the seal means between the tubing hanger 25 and the tubing head 22 may be done in a safe manner without risk of loss of control of the well.

The method of the present invention describes a well operation used to contain the well fluids within a pressurized boundary defined by the seal means 26. During typical well operations, well fluids are injected into the well to effectively "kill" the well and thereafter the flow control means 67 are installed within the tubing hanger 25. Note that the existing wellhead valve apparatus 18 (FIG. 2) may be safely removed from the wellhead 11 prior to engagement of the tubing hanger lift means 60 with the tubing hanger 25.

The backpressure valve may be inserted into the tubing hanger central opening by use of a pressure lubricator to control tubing pressure. As in the case of an injection well that uses a packer and expansion joint to confine and control injected steam, (assuming all pressure containing seals are operational), the backpressure valve may be inserted with a lubricator and the bolts common to the seal flange and the tubing head may then be removed with some tubing pressure present. The tubing hanger may then be landed in the tubing head prior to nipple-up of the blow out prevention equipment.

Many other variations and modifications may be made in the apparatus and techniques hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

I claim as my invention:

1. A well tubing hanger apparatus for use in well fluid control comprising;
   a tubing head having a tubing head opening defined upwardly therethrough,
   a moveable tubing hanger positioned within said tubing head opening, said moveable tubing hanger being moveable relative to said tubing head,
   seal means located between said tubing head and said tubing hanger and being engageable in a fluid-tight manner therebetween, and
   axial movement means operatively connected in a rotatable manner between said moveable tubing hanger and said tubing head to move, when rotated, said tubing hanger relative to said tubing head so as to engage said seal means in a fluid-tight manner between said tubing head and said moveable tubing hanger.

2. A well tubing hanger apparatus for use in well fluid control comprising;

a tubing head having a central longitudinal axis and a tubing head central opening defined upwardly therethrough, a moveable tubing hanger centrally positioned within said tubing head central opening and having a tubing hanger central opening defined upwardly therethrough, said moveable tubing hanger being axially moveable relative to said tubing head along said central longitudinal axis, seal means located between said tubing head and said tubing hanger and being engageable in a fluid-tight manner therebetween, and axial movement means operatively connected in a rotatable manner between said moveable tubing hanger and said tubing head to axially move, when rotated, said tubing hanger relative to said tubing head along said central longitudinal axis, so as to engage said seal means in a fluid-tight manner between said tubing head and said moveable tubing hanger, and to disengage said seal means from said fluid-tight engagement between said tubing head and said moveable tubing hanger.

3. The apparatus of claim 2 wherein said tubing head has an upwardly-facing surface defined circumferentially about the interior of said tubing head, and wherein said moveable tubing hanger has a downwardly facing surface defined circumferentially about the exterior of said moveable tubing hanger, both surfaces capable of cooperative engagement with one another when said tubing hanger is lowered downwardly within said tubing head.

4. The apparatus of claim 2 wherein said seal means further includes at least one seal ring carried in an annular recess formed about the exterior of said moveable tubing head, said seal ring engageable in a fluid-tight manner with the interior of said moveable tubing head and the exterior of said moveable tubing hanger when said moveable tubing hanger is moved downward within said tubing head.

5. The apparatus of claim 4 wherein said at least one seal ring is formed from an elastomeric material.

6. A well tubing hanger apparatus for use in well fluid control comprising:

a tubing head having a central longitudinal axis and a tubing head central opening defined upwardly therethrough, a moveable tubing hanger centrally positioned within said tubing head central opening and having a tubular hanger central opening defined upwardly therethrough, said moveable tubing hanger being axially moveable relative to said tubing head along said central longitudinal axis, seal means located between said tubing head and said tubing hanger and being engageable in a fluid-tight manner therebetween, and axial movement means operatively connected between said moveable tubing hanger and said tubing head to axially move said tubing hanger relative to said tubing head along said central longitudinal axis, so as to engage said seal means in a fluid-tight manner between said tubing head and said moveable tubing hanger, and to disengage said seal means from said fluid-tight engagement between said tubing head and said movable tubing hanger, wherein said axial movement means further includes, a seal flange operatively carried in a fluid-tight manner by the upper surface of said tubing head and located above said moveable tubing hanger, said seal flange having a central longitudinal axis common with the central longitudinal axis of said tubing head and having a seal flange central opening defined upwardly therethrough, and threaded engagement means operatively connected between said seal flange and said moveable tubing hanger and having a first portion and a second portion, both portions having cooperating threads being rotatably engaged with one another, rotation of said seal flange relative to said moveable tubing hanger and rotation of said threaded engagement means between said seal flange and said tubing hanger causing said moveable tubing hanger to move axially relative to said tubing head, one of said threaded engagement means portions operatively formed adjacent a portion of said seal flange central opening, and another of said threaded engagement means portions operatively formed adjacent a portion of said tubing hanger central opening.

7. The threaded engagement means apparatus of claim 6 wherein;

said first portion of said threaded engagement means comprises a threaded receptacle formed radially within said portion of said seal flange central opening, and said second portion of said threaded engagement means comprises a threaded mandrel operatively connected to said moveable tubing hanger and extending upwardly from said moveable tubing hanger into threaded engagement with said threaded receptacle.

8. The apparatus of claim 6 further including;

at least one seal flange seal ring positioned between said tubing head and said seal flange, and fastener means operatively connected between said seal flange and said tubing head, said at least one seal flange seal ring and said fastener means useable in combination to seal said seal flange in a fluid-tight manner to said tubing head, said at least one seal flange seal ring retained in cooperating annular recesses formed in said tubing head and said seal flange.

9. The apparatus of claim 6 further including;

a portion of flow control connection means formed by upwardly and downwardly sloping shoulders located on the interior of said moveable tubing hanger adjacent said moveable tubing hanger central opening, said portion of said flow control connection means formed to operatively engage with another portion of said flow control connection means formed about the exterior of flow control means, said flow control means being lowerable downward through said seal flange central opening and being connectable by engagement of both portions of said flow control connection means to said moveable tubing hanger.

10. The apparatus of claim 6 further including;

a portion of hanger lift connection means formed by threads located on the interior of said moveable tubing hanger adjacent said moveable tubing hanger central opening, said portion of said hanger lift connection means formed to operatively engage in a threaded manner with another portion of said hanger lift connection means formed about the exterior of the lower end of tubing hanger lift means, said tubing hanger lift means being lowerable downward through said seal flange central opening and being connectable by engagement of both portions of said hanger lift connection means to said moveable tubing hanger.

11. The apparatus of claim 6 further including;
a portion of torque generation connection means formed by bar openings defined radially inward about the exterior of said seal flange, said portion of said torque generation connection means formed to operatively engage with another portion of said torque generation connection means defined by the exterior of one end of a bar insertable within at least one of said bar openings.

12. A well tubing hanger apparatus, adapted to provide well fluid control for a well, said apparatus comprising;
a tubing head having a central longitudinal axis and a tubing head central opening defined upwardly therethrough,
a moveable tubing hanger centrally positionable within said tubing head central opening and having a tubing hanger central opening defined upwardly therethrough, said moveable tubing hanger capable of axial movement relative to said tubing head along said central longitudinal axis when installed within said tubing head,
seal means locatable between said tubing head and said tubing hanger and being engageable in a fluid-tight manner therebetween, and
axial movement means operatively connectable in a rotatable manner between said moveable tubing hanger and said tubing head and being capable of axially moving, when rotated, said tubing hanger relative to said tubing head along said central longitudinal axis, so as to engage said seal means in a fluid-tight manner between said tubing head and said moveable tubing hanger, and to disengage said seal means from said fluid-tight engagement between said tubing head and said moveable tubing hanger.

13. A well tubing hanger apparatus, adapted to provide well fluid control for a well, said apparatus comprising:
a tubing head having a central longitudinal axis and a tubing head central opening defined upwardly therethrough,
a moveable tubing hanger centrally positionable within said tubing head central opening and having a tubing hanger central opening defined upwardly therethrough, said moveable tubing hanger capable of axial movement relative to said tubing head along said central longitudinal axis when installed wtihin said tubing head,
seal means locatable between said tubing head and said tubing hanger and being engageable in a fluid-tight manner therebetween, and
axial movement means operatively connectable between said moveable tubing hanger and said tubing head being capable of axially moving said tubing hanger relative to said tubing head along said central longitudinal axis, so as to engage said seal means in a fluid-tight manner between said tubing head and said moveable tubing hanger, and to disengage said seal means from said fluid-tight engagement between said tubing head and said moveable tubing hanger, and wherein said axial movement means further includes,
a seal flange operatively carriable in a fluid-tight manner by the upper surface of said tubing head and locatable above said moveable tubing hanger, said seal flange having a central longitudinal axis common with the central longitudinal axis of said tubing head and having a seal flange central opening defined upwardly therethrough, and
threaded engagement means operatively connectable between said seal flange and said moveable tubing hanger and having a first portion and a second portion, both portions having cooperating threads being rotatably engagable with one another, said seal flange rotatable relative to said moveable tubing hanger, said rotation of said seal flange and rotation of said threaded engagement means between said seal flange and said tubing hanger capable of causing said moveable tubing hanger to move axially relative to said tubing head,
one of said threaded engagement means portions operatively formable adjacent a portion of said seal flange central opening, and
another of said threaded engagement means portions operatively formable adjacent a portion of said tubing hanger central opening.

14. A method of well fluid control comprising the steps of:
providing said well with;
a tubing head having a central longitudinal axis and a tubing head central opening defined upwardly therethrough,
a moveable tubing hanger centrally positioned within said tubing head central opening and having a tubing hanger central opening defined upwardly therethrough, said moveable tubing hanger being axially moveable relative to said tubing head along said central longitudinal axis,
seal means located between said tubing head and said tubing hanger and being engageable in a fluid-tight manner therebetween when said moveable tubing hanger is moved relative to said tubing head, and
axial movement means operatively connected in a rotatable manner between said moveable tubing hanger and said tubing head, being capable when rotated of axially moving said moveable tubing hanger relative to said tubing head along said central longitudinal axis,
rotating said axial movement means,
moving said moveable tubing hanger relative to said tubing head, and
engaging said seal means between said tubing head and said moveable tubing hanger in a fluid-tight manner, thereby preventing fluid flow between said tubing head and said tubing hanger.

15. The method of claim 14 wherein the step of engaging said seal means between said tubing head and said moveable tubing hanger in a fluid-tight manner is done by moving said moveable tubin hanger in a downward direction relative to said tubing head.

16. A method of well fluid control comprising the steps of:
providing said well with;
a tubing head having a central longitudinal axis and a tubing head central opening defined upwardly therethrough, a moveable tubing hanger centrally positioned within said tubing head central opening and having a tubing hanger central opening defined upwardly therethrough, said moveable tubing hanger being axially moveable relative to said tubing head along said central longitudinal axis, seal means located between said tubing head and said tubing hanger and being engageable in a fluid-tight manner therebetween when said moveable tubing hanger is moved within said tubing head, and axial movement means operatively connected between said moveable tubing hanger and said tubing head to axially move said tubing hanger relative to said tubing head along said central longitudinal axis, said axial movement means further including, a seal flange operatively carried in a fluid-tight manner by the upper surface of said tubing head and located above said moveable tubing hanger, said seal flange having a central longitudinal axis common with the central longitudinal axis of said tubing head and having a seal flange central opening defined upwardly therethrough, and threaded engagement means operatively connected between said seal flange and said moveable tubing hanger and having a first portion and a second portion, both portions having cooperating threads being rotatably engaged with one another, rotation of said seal flange relative to said moveable tubing hanger and rotation of said threaded engagement means between said flange and said tubing hanger causing said moveable tubing hanger to move axially relative to said tubing head, one of said portions of said threaded engagement means operatively formed adjacent a portion of said seal flange central opening, and another of said portions of said threaded engagement means operatively formed adjacent a portion of said tubing hanger central opening, rotating said seal flange;

moving said moveable tubing hanger relative to said tubing head; and engaging said seal means between said tubing head and said moveable tubing hanger in a fluid-tight manner, thereby preventing well fluid flow between said tubing head and said tubing hanger.

17. The method of claim 16 wherein the step of engaging said seal means between said tubing head and said moveable tubing hanger in a fluid-tight manner is done by moving said moveable tubing hanger in a downward direction relative to said tubing head.

18. A method of well fluid control comprising the steps of:
providing said well with;

a tubing head having a central longitudinal axis and a tubing head central opening defined upwardly therethrough, a moveable tubing hanger centrally positioned within said tubing head central opening and having a tubing hanger central opening defined upwardly therethrough, said moveable tubing hanger being axially moveable relative to said tubing head along said central longitudinal axis, said tubing hanger capable of having a tubing string attached to the lower portion thereon, seal means located between said tubing head and said tubing hanger and being engageable in a fluid-tight manner therebetween when said moveable tubing hanger is moved within said tubing head, and axial movement means operatively connected between said moveable tubing hanger and said tubing head to axially move said tubing hanger relative to said tubing head along said central longitudinal axis, said axial movement means further including, a seal flange operatively carried in a fluid-tight manner by the upper surface of said tubing head and located above said moveable tubing hanger, said seal flange having a central longitudinal axis common with the central longitudinal axis of said tubing head and having a seal flange central opening defined upwardly therethrough, and threaded engagement means operatively connected between said seal flange and said moveable tubing hanger and having a first portion and a second portion, both portions having cooperating threads being rotatably engaged with one another, rotation of said seal flange relative to said moveable tubing hanger causing said moveable tubing hanger to move axially relative to said tubing head, providing fastener means operatively connected between said seal flange and said tubing head to secure said seal flange to said tubing head, providing torque generation means, a portion of said torque generation means formed to be operatively connected to said seal flange by use of torque generation connection means, said torque generation means being capable of generating and applying sufficient torque to said threaded engagement means to rotate said seal flange relative to said moveable tubing hanger so as to move said seal flange toward and way from said moveable tubing hanger, unfastening said fastener means securing said seal flange to said tubing head, actuating said torque generation means, thereby rotating said seal flange so as to move said moveable tubing hanger a preferred distance away from said seal flange, thereby lowering at least said moveable tubing hanger and said seal means downwardly within said tubing head, and engaging said seal means between said tubing head and said moveable tubing hanger in a fluid-tight manner, thereby preventing fluid flow between said tubing head and said tubing hanger.

19. A method of well fluid control comprising the steps of:
providing said well with;

a tubing head having a central longitudinal axis and a tubing head central opening defined upwardly therethrough, a moveable tubing hanger centrally positioned within said tubing head central opening and having a tubing hanger central opening defined upwardly therethrough, said moveable tubing hanger being axially moveable relative to said tubing head along said central longitudinal axis, said tubing hanger capable of having a tubing string attached to the lower portion thereon, seal means located between said tubing head and said tubing hanger and being engageable in a fluid-tight manner therebetween when said moveable tubing hanger is moved within said tubing head, and axial movement means operatively connected between said moveable tubing hanger and said tubing head to axially move said tubing hanger relative to said tubing head along said central longitudinal axis, said axial movement means further including, a seal flange operatively carried in a fluid-tight manner by the upper surface of said tubing head and located above said moveable tubing hanger, said seal flange having a central longitudinal axis common with the central longitudinal axis of said tubing head and having a seal flange central opening defined upwardly therethrough, and threaded engagement means operatively connected between said seal flange and said moveable tubing hanger and having a first portion and a second portion, both portions having cooperating threads being rotatably engaged with one another, rotation of said seal flange relative to said moveable tubing hanger causing said moveable tubing hanger to move axially relative to said tubing head, one of said portions of said threaded engagement means operatively formed adjacent a portion of said seal flange central opening, another of said portions of said threaded engagement means operatively formed adjacent a portion of said tubing hanger central opening, providing fastener means operatively connected between said seal flange and said tubing head to secure said seal flange to said tubing head, providing tubing hanger lift means, a lower portion of said lift means formed to be lowered downwardly through said seal flange central opening and be operatively connected by use of hanger lift connection means to said moveable tubing hanger, said tubing hanger lift means capable of lifting at least said moveable tubing hanger, said threaded engagement means, said seal flange, and said seal means a selected distance upward relative to said tubing head, providing torque generation means, a portion of said torque generation means formed to be operatively connected to said seal flange by use of torque generation connection means, said torque generation means being capable of generating and applying sufficient torque to said threaded engagement means to rotate said seal flange relative to said moveable tubing hanger so as to move said seal flange toward and away from said moveable tubing hanger, unfastening said fastener means securing said seal flange to said tubing head, lowering said lower portion of said tubing hanger lift means downwardly through said seal flange central opening, operatively connecting said lower portion of said tubing hanger lift means to said tubing hanger by use of said hanger lift connection means, operatively connecting said torque generation means to said seal flange by use of said torque generation connection means, actuating said tubing hanger lift means, thereby lifting at least said moveable tubing hanger, said threaded engagement means, said seal flange, and said seal means a selected distance upward relative to said tubing head, actuating said torque generation means, thereby rotating said seal flange so as to move said seal flange a preferred distance away from said moveable tubing hanger, actuating said tubing hanger lift means, lowering at least said moveable tubing hanger, said threaded engagement means, said seal flange, and said seal means downwardly within said tubing head, and engaging said seal means between said tubing head and said moveable tubing hanger in a fluid-tight manner, thereby preventing fluid flow between said tubing head and said tubing hanger.

20. The method of claim 19 including, prior to the step of engaging said seal means between said tubing head and said moveable tubing hanger in a fluid-tight manner, the following steps of;

providing flow control means formed to be lowered downwardly through said seal flange central opening and operatively connected by use of flow control connection means to said moveable tubing hanger, said flow control means capable of controlling the flow of well fluids through said tubing hanger central opening, lowering said flow control means downwardly through said seal flange central opening, operatively connecting said flow control means by use of said flow control connection means to said moveable tubing hanger, and thereby controlling the flow of well fluids through said tubing hanger central opening.

21. The method of claim 20 including, prior to the step of lowering said flow control means downwardly through said seal flange central opening, the following step of;

injecting well fluid within said well to decrease the pressure of said well fluid at said tubing hanger central opening to ambient pressure.

22. The method of claim 20 including, subsequent to the step of controlling the flow of well fluids through said tubing hanger central opening, the following step of;

removing wellhead valve equipment located above and operatively connected to said seal flange.

23. A method of well fluid control comprising the steps of:

providing said well with;

a tubing head having a central longitudinal axis and a tubing head central opening defined upwardly therethrough, a moveable tubing hanger centrally positioned within said tubing head central opening and having a tubing hanger central opening defined upwardly therethrough, said moveable tubing hanger being axially moveable relative to said tubing head along said central longitudinal axis, said tubing hanger capable of having a tubing string attached to the lower portion thereon, seal means located between said tubing head and said tubing hanger and being engageable in a fluid-tight manner therebetween when said moveable tubing hanger is moved within said tubing head, and axial movement means operatively connected between said moveable tubing hanger and said tubing head to axially move said tubing hanger relative to said tubing head along said central longitudinal axis, said axial movement means further including, a seal flange operatively carried in a fluid-tight manner by the upper surface of said tubing head and located above said moveable tubing hanger, said seal flange having a central longitudinal axis common with the central longitudinal axis of said tubing head and having a seal flange central opening defined upwardly therethrough, and threaded engagement means operatively connected between said seal flange and said moveable tubing hanger and having a first portion and a second portion, both portions having cooperating threads being rotatably engaged with one another, rotation of said seal flange relative to said moveable tubing hanger causing said moveable tubing hanger to move axially relative to said tubing head, one of said portions of said threaded engagement means operatively formed adjacent a portion of said seal flange central opening, another of said portions of said threaded engagement means operatively formed adjacent a portion of said tubing hanger central opening, providing fastener means operatively connected between said seal flange and said tubing head to secure said seal flange to said tubing head, providing tubing hanger lift means, a lower portion of said lift means formed to be lowered downwardly through said seal flange central opening and be operatively connected by use of hanger lift connection means to said moveable tubing hanger, said tubing hanger lift means capable of lifting at least said moveable tubing hanger, said threaded engagement means, said seal flange, and said seal means a selected distance upward relative to said tubing head, lowering said lower portion of said tubing hanger lift means downwardly through said seal flange central opening, operatively connecting said lower portion of said tubing hanger lift means to said tubing hanger by use of said hanger lift connection means, unfastening said fastener means securing said seal flange to said tubing head, actuating said tubing hanger lift means, thereby lifting at least said moveable tubing hanger, said threaded engagement means, said seal flange, and said seal means a selected distance upward relative to said tubing head, providing torque generation means, a portion of said torque generation means formed to be operatively connected to said seal flange by use of torque generation connection means, said torque generation means being capable of generating and applying sufficient torque to said threaded engagement means to rotate said seal flange relative to said moveable tubing hanger so as to move said seal flange toward and away from said moveable tubing hanger, actuating said torque generation means, thereby rotating said seal flange so as to move said seal flange a preferred distance away from said moveable tubing hanger, actuating said tubing hanger lift means, lowering at least said moveable tubing hanger, said theaded engagement means, said seal flange, and said seal means downwardly within said tubing head, and engaging said seal means between said tubing head and said moveable tubing hanger in a fluid-tight manner, thereby preventing fluid flow between said tubing head and said tubing hanger.

* * * * *